United States Patent [19]
Demarest

[11] 3,890,561
[45] June 17, 1975

[54] GATE PULSE POWER SUPPLY FOR STATIC ALTERNATING CURRENT SWITCHES

[75] Inventor: Donald M. Demarest, Wallingford, Pa.

[73] Assignee: General Electric Company, Philadelphia, Pa.

[22] Filed: Nov. 16, 1973

[21] Appl. No.: 416,559

[52] U.S. Cl............ 323/24; 307/252 Q; 307/252 T; 307/311; 321/18
[51] Int. Cl. ............................................. G05f 1/44
[58] Field of Search ............ 321/11, 18, 27; 323/24; 307/252 L, 252 T, 252 Q, 311

[56] References Cited
UNITED STATES PATENTS

| | | | |
|---|---|---|---|
| 3,243,689 | 3/1966 | Perrins.............................. | 321/18 X |
| 3,374,420 | 3/1968 | Weber, Jr. ....................... | 323/24 X |
| 3,405,343 | 10/1968 | Boksjo ............................. | 321/27 R |
| 3,423,664 | 1/1969 | Dewey .............................. | 321/11 |
| 3,693,069 | 9/1972 | Kelley, Jr. et al................. | 323/24 |

Primary Examiner—Gerald Goldberg
Attorney, Agent, or Firm—J. Wesley Haubner

[57] ABSTRACT

An alternating current static switch in which at least one pair of gate controlled semiconductor devices connected in inverse parallel branch circuit relation are alternately rendered conductive during "on" intervals of switch operation is provided with alternate sources for maintaining charge on a gate pulse supply capacitor. One charging sources deriving energy from switch terminal voltage maintains charge during "off" intervals of switch operation. A second charging sources deriving energy from the flow of current through the switch maintains charge during on periods of switch operation.

6 Claims, 1 Drawing Figure

PATENTED JUN 17 1975          3,890,561
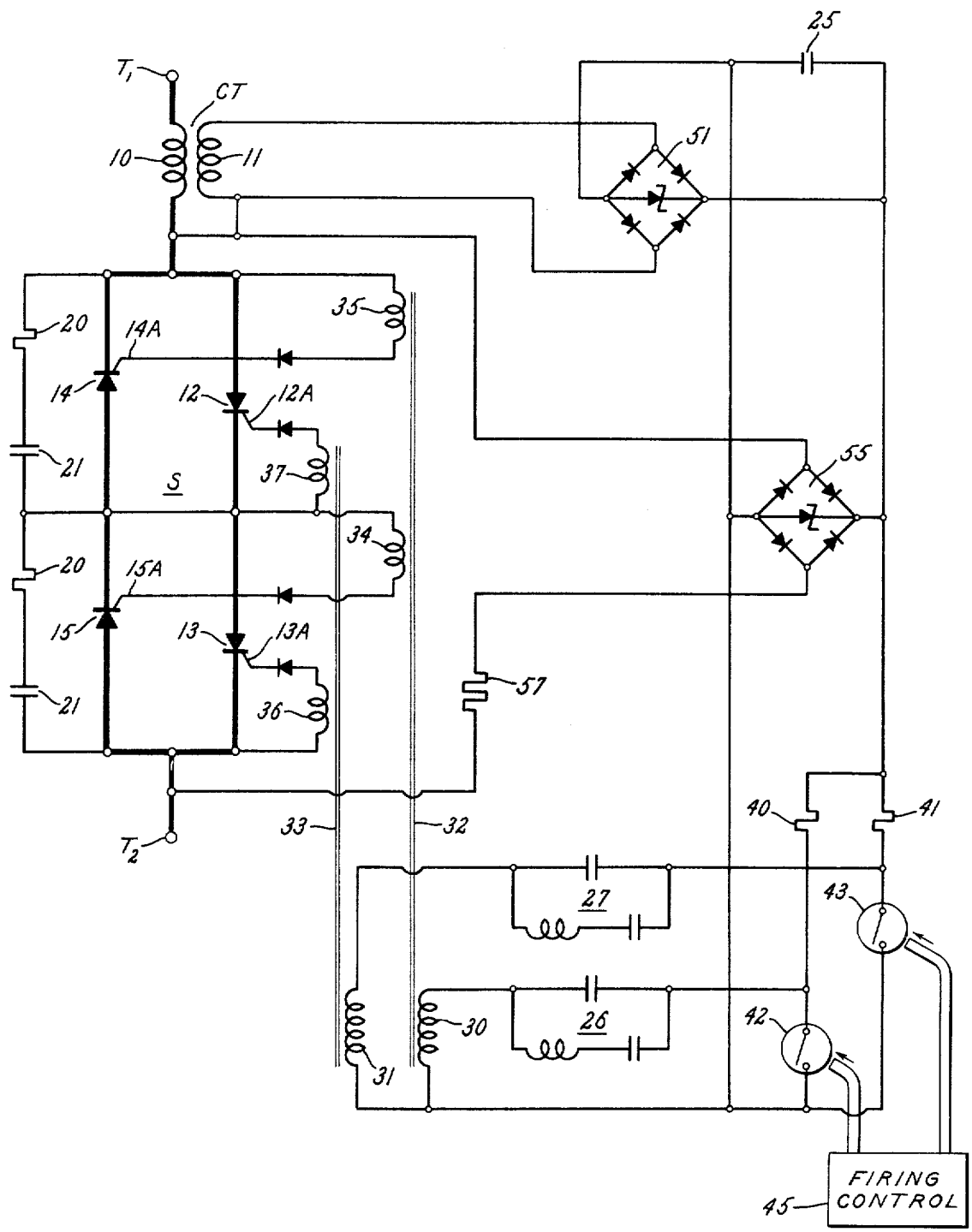

GATE PULSE POWER SUPPLY FOR STATIC ALTERNATING CURRENT SWITCHES

My invention relates to alternating current static switches of the semiconductor type wherein a pair of thyristors (or thyristor groups) are connected in inverse parallel circuit relation and alternately triggered to conduct alternate half cycles of alternating current. The invention relates more particularly to a gate pulse power supply for such switches and is especially applicable to high voltage, high current switches which comprise a plurality of thyristors in each parallel branch of the switch circuit and require a significant quantity of electric power in the gate pulse circuit. The following U.S. Patents are exemplary of related prior art presently known to applicant:

3,423,664—Dewey 3,365,613—Hammerlund 3,243,689—Perinns 2,550,624—Uhlmann et al.

In U.S. Pat. No. 3,423,664—Dewey there is disclosed a gate pulse power supply for a high voltage matrix of thyristors designed for use as a rectifier or inverter, i.e., a matrix or series string of thyristors which conducts alternate half cycles and remains non-conductive on intermediate half cycles of alternating current. In such a converter circuit the thyristors serve as a D-C switch, conducting current of only one polarity. On opposite half cycles inverse voltage appears across the matrix and is used to charge a capacitor which acts as a source of gate pulse power.

In an alternating current switch, on the other hand, a forward current thyristor matrix, or branch circuit, is connected in inverse parallel circuit relation with a reverse current thyristor matrix, so that when the switch is in a fully conductive on condition no appreciable voltage appears across the switch on either forward or reverse half cycles of current. If the thyristors of an AC static switch are phase controlled during conductive or on intervals, instantaneous line voltage does appear at the switch terminals for an initial portion of each half cycle but for small delay angles such voltage is not sufficient to maintain a gate pulse capacitor charged. Full line voltage does of course appear across the switch terminals in its non-conductive or off condition, but during on or conductive intervals voltage at the switch terminals is not a dependable source from which to charge a gate pulse storage capacitor. Accordingly, some other source of charging energy is necessary to maintain the switch in a conductive state after the switch is turned on i.e., conduction is initiated.

It is therefore a principal object of my invention to provide, in a full wave alternating current thyristor switch, improved means for continuously deriving gate pulse energy from the power circuit during conductive on or switch closing intervals.

It is a more particular object of my invention to provide, in a capacitor storage gate pulse supply source for such an alternating current static switch, means for charging the storage capacitor during both closed (i.e., on) and open (i.e., off) intervals of switching operation.

In carrying out my invention in one preferred embodiment I utilize a storage capacitor for supplying energy to the gate pulse circuits of an alternating current static switch of the type comprising at least one pair of gate-controlled semiconductor devices connected to inverse parallel branch circuit relation. To maintain charge on the storage capacitor during open or off intervals of switch operation I provide means for deriving charging energy from the terminal voltage existing across one or more of the then non-conductive thyristors. In order to maintain a charge on the capacitor sufficient continuously to supply gating energy to the switch during closed or on intervals of switch operation I also provide means for deriving additional charging energy from the flow of current through the power circuit controlled by the switch.

My invention will be more fully understood and its several objects and advantages further appreciated by referring now to the following detailed specification taken in conjunction with the accompanying drawing, the single FIGURE of which is a schematic circuit diagram of a static switch including a gate pulse power supply embodying my invention in one form.

Referring now to the drawing, I have shown a static alternating current power switch S connected between terminals $T_1$ and $T_2$ in series with the primary winding 10 of a current transformer CT. The switch S comprises two oppositely poled thyristor circuits, or matrices, connected in parallel circuit relation and each thyristor matrix comprises two similarly poled thyristors connected in series circuit relation. One matrix comprises thyristors 12 and 13 connected to conduct half cycles of current when the terminal $T_1$ is positive with respect to the terminal $T_2$ and the other matrix comprises two thyristors 14 and 15 oppositely poled to conduct half cycles of current when the terminal $T_2$ is positive with respect to the terminal $T_1$. While I have illustrated thyristor matrices, or parallel branch circuits, each comprising two similarly poled thyristors in series, it will of course be understood by those skilled in the art that for higher voltage applications a greater number of similarly poled thyristors may be connected in series circuit relation in each matrix. For high current applications each matrix, or unidirectional branch circuit may comprise a plurality of series-connected thyristor circuits similarly poled and connected in parllel circuit relation. Also, for very high voltage applications several switch assemblies, as the switch S, may be connected in series circuit relation.

It will be understood by those skilled in the art that the thyristors 12, 13, 14 and 15 are gate controlled silicon semiconductor devices each of which has a non-conducting or blocking state in which it presents very high impedance to the flow of current and a conducting or turned-on state in which it freely conducts forward current with only relatively slight voltage drop. The thyristors include, respectively, control or gating electrodes 12A, 13A, 14A and 15A each of which is effective to switch the associated thyristor abruptly from its blocking state to its turned-on state when provided with a current impulse or gating signal while "forward" bias exists on its main electrodes (i.e., the thyristor anode is positive with respect to its cathode). As is well known to those skilled in the art, such a gating signal is effective to render a thyristor conductive at any time during a half cycle in which such forward bias exists. Once conduction is initiated during any half cycle the thyristor will continue to conduct forward current until that current is reduced below a predetermined holding level irrespective of voltage on the gate. The time during which the thyristor is conductive in any half cycle, measured in electrical degrees from the instant of turn-on, is referred to as the "conduction angle". The time during any half cycle of positive bias potential prior to the initiation of conduction, measured in electrical degrees from the prior voltage zero, is referred to as the "delay angle" or "gating angle". Gating angle may, if desired, be varied by control of the phase relation of gating impulses with respect to the initiation of forward voltage thereby to control the magnitude of average current traversing the thyristor.

In the switch S each thyristor 12, 13, 14 and 15 is shunted by an RC circuit comprising a resistor 20 and a capacitor 21 for the purpose of transiently stabilizing voltage across the series connected thyristors of each matrix during the transition between blocking and conducting states of the thyristors. Such stabilizing circuits are disclosed and more fully described in U.S. Pat. No. 3,423,664—Dewey.

In order to derive thyristor gate pulse energy from the power circuit controlled by the static switch S I provide an energy storage capacitor 25 which is charged from the power circuit by means to be more fully described hereinafter and connected to energize a pair of gate pulse generators 26, 27. The gate pulse generators 26, 27 have been illustrated as pulse forming networks of the type described in the aforementioned Dewey Patent. Output of the pulse forming networks is supplied on alternate half cycles to primary windings 30, 31 of gate pulse transformers 32, 33, respectively. The gate pulse transformer 32 is provided with secondary windings 34, 35, connected to energize the gating electrodes 15A and 14A, respectively of one thyristor matrix in the switch S. The gating electrodes 13A, 12A of the oppositely poled thyristor matrix are energized, respectively, by secondary windings 36, 37 of the gate pulse transformer 33. Between the storage capacitor 25 and the pulse forming networks 26, 27 I provide current limiting resistors 40 and 41, respectively, and light-actuated firing switches 42, 43, respectively. During conductive intervals of the static switch S the firing switches 42, 43 are synchronously and alternately closed on alternate half cycles of power circuit frequency by a suitable firing control unit 45. The firing control 45 provides the primary control for the static switch and may, if desired, include means for variably phase controlling the thyristor gates during on or conductive intervals of switch operation. Desirably the firing control 45 is similar to the gating control described in U.S. Pat. No. 3,693,069—Kelley et al. It will of course be understood by those skilled in the art that the light-pipe actuating means schematically illustrated between the control 45 and firing switches 42, 43 is optional but is desirable for high voltage applications where the gate pulse supply circuit must be at very high voltage above ground while the firing control is preferably at low voltage.

As previously explained, gate pulse power is required during a switch closing or conductive interval, but if the thyristors are fully conductive during such interval substantially no voltage appears between the switch terminals $T_1$, $T_2$ during either half cycle of current flow in the power circuit. During conductive intervals, therefore, switch terminal voltage may not be available to supply charging energy to the storage capacitor 25. During such intervals I derive energy for charging the storage capacitor 25 through a means responsive to the flow of power current through the static switch S. I have illustrated such a charging source as the current transformer CT having a secondary winding 11 coupled to the power circuit and supplying direct current to the storage capacitor 25 through a full wave rectifier bridge 51. One terminal of the secondary winding 11 is preferably connected to the adjacent primary winding 10 so that one input terminal of rectifier 51 is tied to power circuit voltage at a selected point.

While the current transformer CT and rectifier 51 operate to provide a continuous supply of gate pulse power during on or conductive intervals in operation of the static switch S, this source responsive to power circuit current will not maintain the capacitor 25 charged during non-conductive or off intervals of switch operation. During these intervals however, line voltage does appear across the switch terminals $T_1$, $T_2$ and a proportionate part of line voltage appears across each stabilizing RC circuit 20, 21. I therefore utilize such a terminal voltage source to charge the capacitor 25 during open or off periods of switch operation. For this purpose I connect the input terminals of a full wave rectifier bridge 55 through a resistor 57, across the switch terminals $T_1$, $T_2$ and connect the capacitor 25 across the direct current output terminals of the rectifier.

The output terminals of rectifier bridges 51 and 55 are thus connected in parallel circuit relation to charge the storage capacitor 25 and one input terminal of each rectifier bridge is connected to a common point on the power circuit. The resistor 57 appropriately reduces the voltage drop applied to the input of rectifier 55.

It will be understood that in operation the charging source responsive to power circuit voltage, i.e., including the rectifier 55, maintains the capacitor 25 in a fully charged state during an open or non-conductive interval of static switch operation and thus is continuously available to initiate switch conduction in response to the firing control 45. During a subsequent closed or conductive interval of switch operation the capacitor 25 is maintained in an adequately charged state from the current responsive charging source which includes the rectifier 51 and current transformer CT. The voltage responsive and current responsive charging sources are both connected at all times and in parallel across the capacitor 25 so that the source having the higher voltage is effective to charge the capacitor. For the reasons pointed out above only the voltage responsive source is operable during non-conductive intervals of switch operation. During conductive intervals the current responsive source is always operable but energy may additionally be derived from the voltage-responsive source if the thyristor gating angles are of the order of 40 electrical degrees or more.

It will now be evident to those skilled in the art that in carrying out my invention the voltage responsive charging circuit for the gate pulse energy storage device may derive energy during non-conductive (i.e., off or open) intervals of switch operation from the voltage appearing between one or more elements of the power switching circuit, such as the voltage across the switch terminals of one or more serially connected thyristors or snubber impedances between the terminals. Similarly the current responsive charging source may receive energy through a current transformer interposed at any convenient location in the switch circuit or through other means responsive to power circuit current. Such other means may, for example, be means responsive to the heating effect of power current. Preferably however the current source is associated with a portion of the power circuit which carries both forward and reverse half cycles of the alternating current.

In applications of my improved switch which require a large number of thyristors in series, for example 10 or more, it is desirable to divide the switch into several like sections each similar to the switch S as illustrated, and to connect the sections in series circuit relation. In a two section switch so assembled separate gate supply capacitors and associated current and voltage charging circuits may advantageously be provided for each switch section. By locating the current transformers CT between two series-connected switch sections insulation of the gate pulse supply components may be minimized. Moreover a two section switch with separate gate pulse storage capacitors facilitates redundant gate drive circuitry to ensure reliability. For example, the gate pulse transformers associated with each sectional storage capacitor may have secondary windings associated with the similarly-poled thyristor matrices of both switch sections.

While I have described certain preferred embodiments of my invention by way of illustration many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. Alternating current static switching apparatus for an electric power circuit comprising, at least one pair of gate controlled semiconductor devices connected in inverse parallel branch circuit relation between a pair of switch terminals, said semiconductor devices each including an anode, a cathode and a gating electrode and said devices being oppositely poled for conduction of opposite half cycles of alternating power current, synchronous gate pulse generating means connected to supply current pulses to said gating electrodes during opposite half cycles when forward voltage exists between the anode and cathode of said devices respectively thereby alternately to render said devices conductive, electric energy storage means for energizing said gate pulse generating means, means responsive to voltage between said switch terminals to supply electric charging current to said energy storage means during non-conductive intervals of switch operation, and means responsive to the flow of power current through at least one of said semiconductor devices to supply electric charging current to said energy storage means during conductive intervals of switch operation.

2. Alternating current static switching apparatus according to claim 1 wherein each pair of inverse parallel branch circuits between said switch terminals comprises oppositely poled matrices of thyristors and each said matrix includes an equal plural number of thyristors in series circuit relation.

3. Alternating current static switching apparatus according to claim 1 wherein said power current responsive means is responsive to flow of current in both directions through said semiconductor devices.

4. Alternating current static switching apparatus according to claim 1 wherein said voltage responsive means comprises a rectifier having an input circuit connected across at least one of said semiconductor devices.

5. Alternating current static switching apparatus according to claim 1 which includes an alternating current conductor between said switch terminals and wherein said current responsive means comprises a current transformer having a secondary winding coupled to said conductor and full wave rectifier having an input circuit connected across said secondary winding.

6. Alternating current static switching apparatus according to claim 1 which includes a capacitor and resistor serially connected in a stabilizing circuit across each said semiconductor device and wherein said voltage responsive means comprises a full wave rectifier having an input circuit connected across at least one stabilizing impedance.

* * * * *